US010246356B2

(12) United States Patent
Van Der Wal et al.

(10) Patent No.: US 10,246,356 B2
(45) Date of Patent: Apr. 2, 2019

(54) APPARATUS FOR REMOVAL OF IONS COMPRISING MULTIPLE STACKS

(75) Inventors: Albert Van Der Wal, Oegstgeest (NL); Hank Robert Reinhoudt, Delft (NL); Diederik Geert Femme Verbeek, Pijnacker (NL); Lucas Johannes Cornelis Kouters, Amersfoort (NL)

(73) Assignee: VOLTEA B.V., Sassenheim (NL)

( * ) Notice: Subject to any disclaimer, the term of this patent is extended or adjusted under 35 U.S.C. 154(b) by 246 days.

(21) Appl. No.: 13/990,390

(22) PCT Filed: Nov. 30, 2011

(86) PCT No.: PCT/NL2011/050821
§ 371 (c)(1),
(2), (4) Date: Nov. 1, 2013

(87) PCT Pub. No.: WO2012/074397
PCT Pub. Date: Jun. 7, 2012

(65) Prior Publication Data
US 2014/0048418 A1   Feb. 20, 2014

(30) Foreign Application Priority Data
Dec. 1, 2010   (NL) .................................... 2005799

(51) Int. Cl.
*C02F 1/469* (2006.01)
*C02F 1/461* (2006.01)

(52) U.S. Cl.
CPC ........ *C02F 1/4691* (2013.01); *C02F 1/46176* (2013.01); *C02F 1/4695* (2013.01); *Y10T 29/49117* (2015.01); *Y10T 29/49208* (2015.01)

(58) Field of Classification Search
CPC ..................................................... C02F 1/4691
See application file for complete search history.

(56) References Cited

U.S. PATENT DOCUMENTS

| 5,360,540 A | 11/1994 | Andelman |
| 5,415,768 A | 5/1995 | Andelman |
| 5,547,581 A | 8/1996 | Andelman |
| 5,748,437 A | 5/1998 | Andelman |

(Continued)

FOREIGN PATENT DOCUMENTS

| EP | 2 098 485 | 9/2009 |
| EP | 2 253 593 | 11/2010 |

(Continued)

OTHER PUBLICATIONS

U.S. Office Action dated Jul. 31, 2015 in corresponding U.S. Appl. No. 13/306,585.

(Continued)

*Primary Examiner* — Salil Jain
(74) *Attorney, Agent, or Firm* — Pillsbury Winthrop Shaw Pittman LLP

(57) ABSTRACT

An apparatus to remove ions from water. The apparatus may include a stack having a first electrode including a first current collector, a spacer on top of the first electrode, and a second electrode on top of the spacer. The stack may have a tray to hold and position the stack within a housing of the apparatus and thus may improve the manufacturability of the apparatus.

22 Claims, 2 Drawing Sheets

(56) References Cited

U.S. PATENT DOCUMENTS

| | | | |
|---|---|---|---|
| 6,358,641 B1 * | 3/2002 | Mease | H01M 8/0247 |
| | | | 429/470 |
| 6,413,409 B1 * | 7/2002 | Otowa | C02F 1/008 |
| | | | 204/257 |
| 8,968,544 B2 | 3/2015 | Van Limpt et al. | |
| 9,096,451 B2 | 8/2015 | Van Der Wal et al. | |
| 9,365,440 B2 * | 6/2016 | van der Wal | C02F 1/4691 |
| 2004/0188246 A1 | 9/2004 | Tran | |
| 2007/0158185 A1 | 7/2007 | Andelman et al. | |
| 2009/0218227 A1 | 9/2009 | Noh et al. | |
| 2009/0255815 A1 | 10/2009 | Shiue | |
| 2010/0025247 A1 | 2/2010 | Daily, III | |
| 2010/0078327 A1 | 4/2010 | Noh | |
| 2011/0240474 A1 * | 10/2011 | Seed | C02F 1/46114 |
| | | | 204/660 |
| 2012/0005885 A1 * | 1/2012 | Kwok | H01M 8/247 |
| | | | 29/760 |
| 2012/0138470 A1 | 6/2012 | Van Der Wal et al. | |
| 2013/0092542 A1 | 4/2013 | Van Limpt et al. | |
| 2013/0098766 A1 | 4/2013 | Van Der Wal et al. | |

FOREIGN PATENT DOCUMENTS

| | | |
|---|---|---|
| JP | 05-258992 | 10/1993 |
| JP | H09-509880 | 10/1997 |
| JP | 2000-091169 | 3/2000 |
| JP | 2013-525103 | 6/2013 |
| WO | 2009/062872 | 5/2009 |
| WO | 2010/069065 | 6/2010 |
| WO | 2010/150534 | 12/2010 |

OTHER PUBLICATIONS

International Search Report and Written Opinion dated Feb. 3, 2012 in corresponding International Patent Application No. PCT/NL2011/050821.

Search Report and Written Opinion dated Aug. 5, 2011 in corresponding Netherlands Patent Application No. NL 2005799.

Search Report and Written Opinion dated Aug. 4, 2011 in corresponding Netherlands Patent Application No. NL 2005797.

European Search Report and Written Opinion dated Jan. 18, 2012 in corresponding European Patent Application No. 11 19 1188.

* cited by examiner

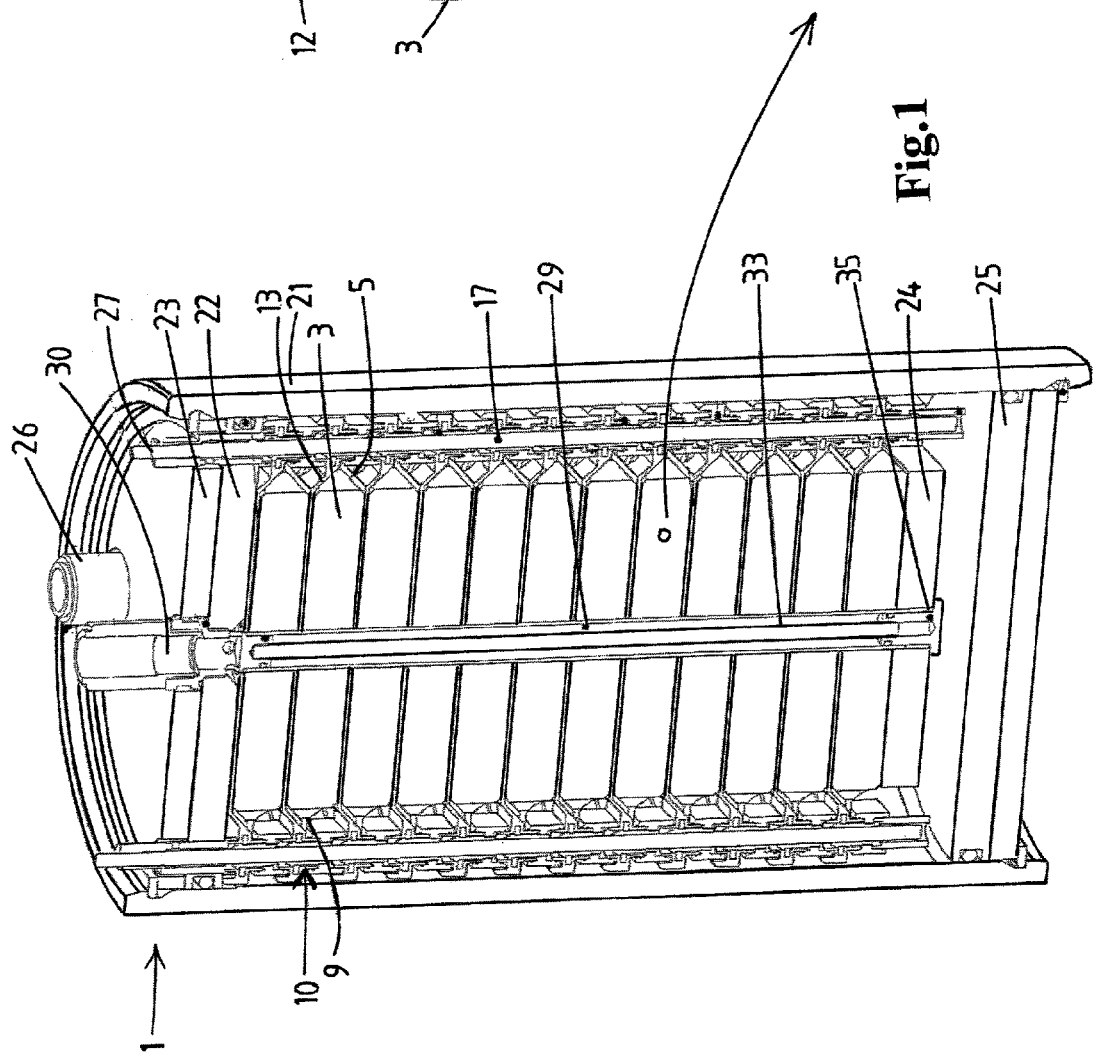
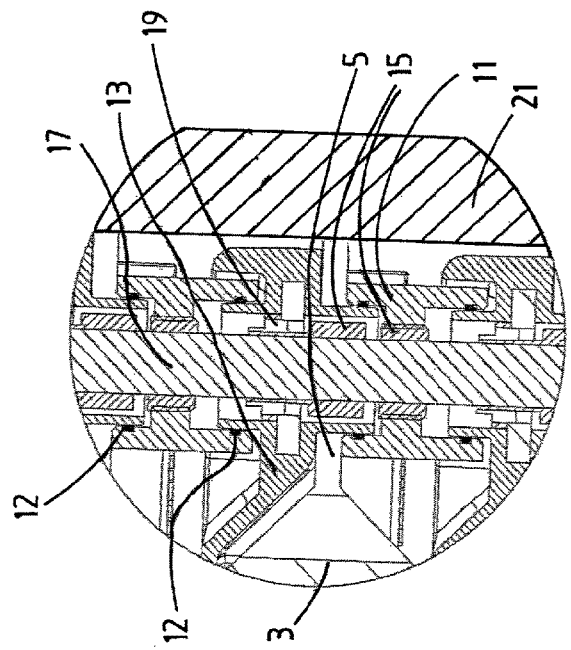
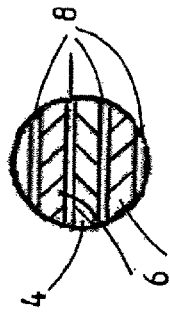

APPARATUS FOR REMOVAL OF IONS COMPRISING MULTIPLE STACKS

FIELD

The invention relates to an apparatus to remove of ions from water and a method of producing an apparatus to remove ions from water.

BACKGROUND

In recent years one has become increasingly aware of the impact of human activities on the environment and the negative consequences this may have. Ways to reduce, reuse and recycle resources are becoming more important. In particular, clean water is becoming a scarce commodity. Therefore, various methods and devices for purifying water have been published.

A method for water purification is by capacitive deionization, using an apparatus provided with a flow through capacitor (FTC) for removal of ions in water. The FTC functions as an electrically regenerable cell for capacitive deionization. By charging electrodes, ions are removed from an electrolyte and are held in electric double layers at the electrodes. The electrodes can be (partially) electrically regenerated to desorb such previously removed ions without adding chemicals.

The apparatus for removal of ions comprises one or more pairs of spaced apart electrodes (a cathode and an anode) and a spacer, separating the electrodes and allowing water to flow between the electrodes. The electrodes are provided with current collectors or backing layers and a high surface area material, e.g. carbon, which may be used to store removed ions. The current collectors may be in direct contact with the high surface area material. Current collectors are electrically conductive and transport charge in and out of the electrodes and into the high surface area material.

A charge barrier may be placed adjacent to an electrode of the flow-through capacitor. The term charge barrier refers to a layer of material which is permeable or semi-permeable for ions and is capable of holding an electric charge. Ions with opposite charge as the charge barrier charge can pass the charge barrier material, whereas ions of similar charge as the charge of the charge barrier cannot pass the charge barrier material. Ions of similar charge as the charge barrier material are therefore contained or trapped either in e.g. the electrode compartment and/or in the spacer compartment. The charge barrier is often made from an ion exchange material. A charge barrier may allow an increase in ionic efficiency, which in turn allows energy efficient ion removal.

SUMMARY

The apparatus may be provided with a housing comprising a water inlet to let water in the housing and a water outlet to let water out of the housing. In the housing of the apparatus for removal of ions, electrodes and spacers may be stacked in a "sandwich" fashion by a compressive force, normally by mechanical fastening. During manufacturing of the stack the electrodes and the spacer may be assembled together in the housing. It may be important that the electrodes and spacers be precisely held with respect to each other in the housing, making the manufacturing a difficult task.

Accordingly, it is desirable to provide an apparatus to remove ions with an improved manufacturability and/or an improved method of producing an apparatus to remove ions.

Accordingly, there is provided an apparatus to remove ions, the apparatus comprising:
multiple stacks, each stack comprising:
    a first electrode;
    a second electrode; and
    a spacer, in between the first and second electrodes, allowing water to flow in between the first and second electrodes;
wherein at least one of the stacks is provided with a tray for holding and positioning the at least one stack within a housing of the apparatus.

By assembling and holding at least one stack in a tray the apparatus may be manufactured by positioning one or more trays within the housing. This way accurate alignment of the electrodes and spacers in the housing may be easier than when the electrodes and spacers are provided separately or individually inside the housing. The tray may comprise one or more alignment features which may be used to align the first and second electrodes and the spacer in the tray and to align multiple trays in the same housing. Alignment is significant in order to help ensure good positioning of the electrodes and spacers within a stack and within the housing. As a result, the performance of the electrodes and the flow through the spacer may become more equal, independent of the position of the electrodes and spacers in a stack and the position of a stack in the housing. In addition, the tray(s) can slide along at least one central rod during manufacturing of the stacks in the housing. This may allow a compressive force, which is applied to a stack during manufacturing, to be the same or at least very similar for the individual stacks. This in turn may result in the desalination performance of the different stacks to be independent of the position of the stack in the housing.

According to a further embodiment there is provided a method of manufacturing an apparatus to remove ions from water, the method comprising:
manufacturing a stack by:
    providing a first electrode in a tray,
    providing a spacer against the first electrode in the tray, and
    providing a second electrode against the spacer in the tray;
positioning the tray within a housing of the apparatus.

By assembling and holding the stack in a tray the apparatus may be manufactured by positioning and aligning the tray within the housing. This way the accurate alignment of the electrodes and spacers in the housing may be easier than when the electrodes and spacers are provided separately or individually in the housing.

The first electrodes may be connected with a first power terminal and the second electrode may be connected to a second power terminal. The stacks may be compressed within the housing. Water may be provided to the stacks within the housing via a water inlet and this water may be allowed to flow through the spacer in between the electrodes to a water outlet while charging the electrodes and removing ions from the water flowing through the spacer.

These and other aspects, features and advantages will become apparent to those of ordinary skill in the art from reading the following detailed description and the appended claims. For the avoidance of doubt, any feature of one aspect of the present invention may be utilized in any other aspect of the invention. It is noted that the examples given in the description below are intended to clarify the invention and are not intended to limit the invention to those examples per se. Similarly, all percentages are weight/weight percentages unless otherwise indicated. Numerical ranges expressed in the format "from x to y" are understood to include x and y. When for a specific feature multiple preferred ranges are described in the format "from x to y", it is understood that all ranges combining the different endpoints are also contemplated.

BRIEF DESCRIPTION OF THE FIGURES

Embodiments of the invention will be described, by way of example only, with reference to the accompanying schematic drawings in which corresponding reference symbols indicate corresponding parts, and in which:

FIG. 1 shows a schematic cross-section of an apparatus for removal of ions produced with a method according an embodiment of the invention;

FIG. 2a shows a detail enlargement of the stack 3 of FIG. 1;

FIG. 2b shows a detail of FIG. 1;

DETAILED DESCRIPTION

Figure 4:
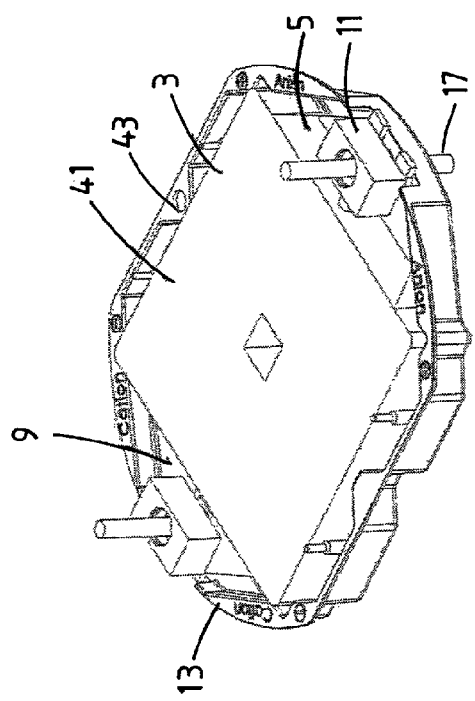
FIG. 4 shows a top view on a tray for use in a method according to an embodiment of the invention provided with a stack.

FIG. 1 shows a schematic cross-section of an apparatus for removal of ions 1 produced with a method according an embodiment of the invention with a part of the housing removed. In the example the apparatus may comprise twelve flow through capacitor stacks 3. The flow through capacitor stack 3 may be provided with repeating units of a first electrode 4 (see FIG. 2a, which is an enlargement of a stack), a spacer 8, and a second electrode 6. The first electrode 4 may be provided with one or more first current collectors 5 (see FIG. 1), which may be bundled together with a first connector 11. The second electrode 6 may be provided with one or more second current collectors 9, which may equally be bundled together on the other side of the apparatus with a second connector 10.

The first connector 11 (see FIG. 2b, which is a partial enlargement of FIG. 1) may be used to clamp a plurality of first current collectors 5 together and similarly, the second connector 10 may be used to clamp a plurality of second current collectors 9 together. The current collectors 5, 9 and the first connector 11 and the second connector 10 may be made of the same material e.g. carbon (e.g. graphite) to lower the electrical resistivity between the current collectors 5, 9 and the connectors 11, 10. The first connector 11 may be provided with inserts 15 e.g. from a metal, such as, for example copper. The inserts 15 may be screwed in the first connector 11 so as to help assure low electrical resistivity between the insert 15 and the first connector 11. The power terminal 27 is a construction that is connected to both the power supply and one or more connectors 10, 11. The power terminal 27 may be fixed into the upper and/or bottom part 22, 24 and for any other part of the housing. The power terminal 27 may be provided with a rail e.g. rod 17 made of, for example, metal e.g. copper, to electrically connect the first connectors 11 via their inserts 15 to a power source (not shown). The first connector 11 and the insert 15 may be provided with an opening for the rod 17. The insert 15 and the rod 17 may be shielded from the water inside the apparatus by e.g. resin, glue or a paste which functions as a water barrier. The resin, glue, paste or any other water shielding material may optionally be applied to the hollow parts 19 of the connector 11 after compression of the stack.

To circumvent that the resin may contaminate the stack 3, one or more rubber rings 12 may be provided in the insert 15. A tray 13 may be provided to help manufacture one stack 3 and assemble the stacks 3 together in a housing 21 of the apparatus. The housing may be water tight. Water may flow around the tray and into the stack. Within the housing the stacks 3 may be compressed between the top and bottom part 22, 24. The top part 23 of the housing 21 is provided with a feed-through allowing the rod 17 to make a connection with a power source. This way electrical charge can enter the first electrode via the first current collector 5 and also leave the electrode again, e.g. during regeneration of the electrodes. Water may be provided to an interior of the apparatus via a water inlet 26 into the housing. The water is allowed to flow around the tray and the flow-through capacitor stacks 3 and may enter the stacks via one or more spacers. The flow-through capacitor stack 3 may be provided with a hole in the middle of the stack. In the hole a circular tube 29 may be provided and via the space between the hole and the tube the water may flow to an outlet 30. The interior of the tube 29 may be provided with a nut 35 and threaded bar 33 which may help to compress the electrodes in the stacks 3 and to compress the stacks 3 between the upper and bottom part 22, 24 of the housing 21.

Compressing may occur during production of the apparatus, or optionally during maintenance. By compressing all the stacks at once it may help assure that the compression force is very similar or even equal for each stack and at the same equally or homogeneously distributed over the surface of the electrodes.

During manufacturing of the stack 3 a first electrode comprising a first current collector 5 may be provided in a tray 13. A spacer may be located on top of the first electrode; and a second electrode may be put on top of the spacer. Subsequently a spacer may be put on top of the second electrode followed by another first electrode. This may be repeated until for example 10 first and second electrode units are provided in the stack 3 held by the tray 13, each first electrode separated from a second electrode with a spacer. Subsequently a connector 11 may be located on top of the current collector 5 and a metal insert 15 may be screwed from the other side of the stack 3 through the tray 13 and the first current collector 5 to fix the stack 3 to the tray 13.

The tray 13 and the stack 3 may be connected to the rod 17 of the first power terminal 27 by sliding the insert 15 over the rod 17 to allow a good electrical contact. The hole in the insert 15 may be of such a size that it allows for good electrical contact between the insert 15 and the rod 17 and at the same time allowing the insert 15 to slide over the rod 17. The connector 11 may be pressed on the tray 13 with the current collector 5 or multiple current collectors 5 in between the connector 11 and the tray 13 by screwing of the insert 15 in the connector 11. To help assure good electrical conductivity between the connector 11 and the first current collector 5, the pressure on the connector 11 and the current collector may be less than 100 Bar, less than 50 Bar, less than 20 Bar or around 10 Bar.

Multiple stacks 3 can be connected to the rod 17 and the stacks 3 may be connected in a similar way to the second connector 10. A force may be exerted on the stacks 3 with the nut 35 and threaded bar 33 via the upper and bottom part 22, 24 so as to compress the first and second electrodes in a first direction substantially parallel to the length of the threaded bar 33 which is perpendicular to the main surface of the electrode. The force may exert a pressure on one or more stacks of less than 5 Bar, less than 2 Bar, less than 1 Bar or around 0.5 Bar.

The first and second connectors 11, 10 allow for movement of the first and second current collectors 5, 9 along the rod 17 in the first direction such that the current collectors are not damaged by the compression force on the stack 3. The movement may be in the order of 0.05 to 10% of the height of the multiple stacks 3 in the first direction. After enough pressure is exerted on the stack a resin may be provided along or through the first and/or second connector 11, 10 in the hollow parts 19 of the connectors 10, 11. The resin after hardening fixes the position of the connectors 10, 11 and may protect the (metal) inserts 15 and rod 17 from corrosion. The efficiency of the apparatus may be preserved for a long period since the water in the interior of the housing may not be in direct contact with the metal insert 15 and rod 17 and therefore corrosion may be prevented and the performance of the apparatus may not deteriorate due to corrosion.

Figure 3:
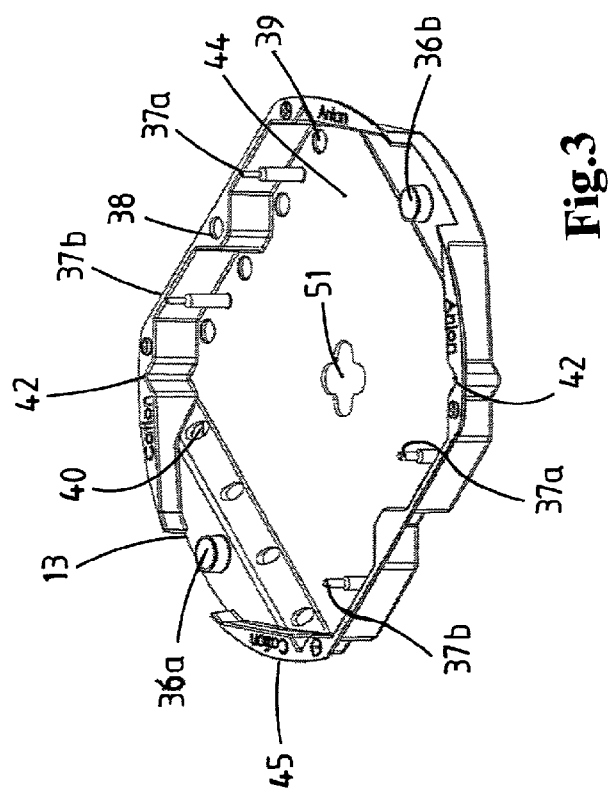
FIG. 3 shows a top view on a tray for use in a method according to an embodiment of the invention.

FIG. 3 shows a top view of a tray 13 for use in a method according to an embodiment of the invention. The tray 13 may be provided with openings e.g. holes 36a, 36b, which may be used to slide the tray along the rod 17 (see FIG. 2) and to position the current collectors in the tray 13. The tray 13 may be provided with pins 37a, 37b for alignment of the electrodes which may positioned within the tray 13. The pins 37a and the hole 36a may be used to align the second current collector while the pins 37b and the hole 36b may be used to align the first current collector. The pins may also be used to align different trays with each other. The round openings 39 may function as an inlet for the water and the opening 51 as an outlet for the water. The tray may be produced from polypropylene and may be provided with a reinforcement plate (not shown), e.g. from metal, to provide stiffness against the pressure of the connector 11. The corner 42 may be used to align the spacers. The spacers may be used to electrically insulate the first and the second electrodes from each other and to allow for flow in between the first and the second electrodes and may be a little larger than the first and second electrodes.

FIG. 4 shows a top view of a tray 13 for use in a method according to an embodiment of the invention provided with a stack 3. The stack comprises a first and second electrodes provided with current collector 5, 9. A connector 11 may be provided to clamp the first current collector 5 against the tray 13. The connector 11 may be provided with a screw thread and an insert 15 (see FIG. 2) may be screwed in the connector 11 while clamping the current collector 5 and the tray 13 together. The height of the stack 3 in the first direction perpendicular to the main surface 41 of the electrode, provided within the tray 13 may be larger than the height of the tray 13. First current collector 5 and first connector 11 may be provided around the opening 36b so as to allow for movement of the stack 3 along the rod 17. This way it is possible to exert a force on the stack 3 to compress the electrodes together without damaging the current collectors 5, 9 and or the connectors during compression. The connector 11 including the insert 15, and the tray 13 are designed such that they can partly move into each other while being aligned along the rod 17. Please note that the stack 3 and tray 13 constructed in FIG. 4 may be used upside down in the apparatus according to FIG. 1. The stack 3 may be provided with one or more charge barrier layers, such as ion exchange membranes, which can be applied as a separate layer on top of the electrodes or integrated with the first and/or second electrode e.g. as a coating. The tray 13 (see FIG. 3) may be provided with an alignment feature, for example: a notch, an edge 38 or a corner 42; a protrusion or a pin 37; or a rod to position the first electrode, the second electrode, and/or the spacer in the tray 13. The first electrode, the second electrode and/or the spacer may be provided with an alignment feature, for example an edge 43, to position the first electrode, the second electrode, and/or the spacer in the tray 13. The alignment feature of the tray 13 may be constructed and arranged to match/align the alignment feature of the first electrode, the second electrode and/or the spacer. The tray 13 may be provided with an alignment feature, for example an opening 36a,b to position the tray 13 in the apparatus for removal of ions 1. The apparatus may be provided with an alignment feature, for example the rod 17 to position the tray 13 in the housing 21 of the apparatus 1. The opening 36a, b may be constructed and arranged to cooperate with the rod 17, for example the size of the opening and the rod may be substantially matching.

The alignment feature e.g. rod 17 of the apparatus to position the tray 13 in the apparatus 1 (see FIG. 1) may be part of a connector to electrically connect the first or second electrode to a power terminal 27. The rod 17 may be made from metal, e.g. copper, to increase the electrical conductance of the connector. The alignment feature may have a substantially circular or rectangular shape in one of its cross-sections, such as for example the pin 37a or the opening 36a. The tray 13 may be provided with an opening 39, 40, 51 for water to flow through the tray 13. The opening 36a or 36b in the tray 13 may be constructed and arranged to electrically connect the first or second electrode to a power terminal 27.

The tray 13 may comprise a main surface 44 facing the main surface 41 of the electrode stack 3 and a rim 45 extending substantially perpendicular to the main surface 44 of the tray 13. Multiple stacks 3 in their respective trays 13 may be stacked within the housing 21 of the apparatus 1. The tray 13 may be provided with a hole 51 for a compressing member e.g. threaded bar 33 compressing the electrodes within the apparatus 1.

The tray 13 may be provided with a pin 37a as an alignment feature to align the tray with other trays. For example the top of the pin 37a which is thinner than the rest of the pin may be received by an opening in another tray, for example on the other side with respect to the main surface 44 of the tray 13. The use of the alignment features helps assure a good positioning of the electrodes and spacers within the apparatus and thus helps assure that all electrodes and stacks equally contribute to the performance of the flow through capacitor.

Electrode

The electrodes (anode and or the cathode) may be made metal free by making them from carbonaceous material, for example activated carbon, which may be bound together in a polytetrafluoroethylene (Teflon™) matrix or carbon aerogel. The electrodes, which may be used in FTC cells, may be treated with a concentrated salt solution to promote the ion removal capacity of the electrodes as well as ion conductivity and hence the speed of removal.

The material for storage of the ions may comprise a high surface area layer e.g. a porous carbon layer, which can be a flexible layer, or a non flexible layer.

The carbon used in the electrode layer may comprise activated carbon, and optionally any other carbonaceous material, such as carbon black, carbon aerogel, carbon nanofibers, graphene or carbon nanotubes. The carbon may be chemically activated carbon or may be steam activated carbon. The carbon may have a high surface area of at least 500 $m^2/g$, at least 1000 $m^2/g$, or at least 1500 $m^2/g$. The anode and cathode may even be made out of different carbonaceous materials. Well known non-flexible carbon layers are made from carbon aerogels. These aerogels are often manufactured as composite paper: non-woven paper made of carbon fibers, impregnated with resorcinol-formaldehyde aerogel, and pyrolysis. Depending on the density, carbon aerogels may be electrically conductive, making composite aerogel paper useful as electrodes for deionization in a flow-through capacitor.

The carbon may be present in the electrode in a concentration of at least 60%, at least 70%, at least 80%, or at least 85% by weight of the dry electrode. The use of thermoplastic or viscoelastic material, such as latex or a curable resin, to form a monolith from powdered material is common. Examples of carbon layers that use polytetrafluoroethylene (PTFE) as binder material are the PACMM™ series (from Material Methods).

One embodiment of the invention comprises an active carbon fiber woven layer or carbon cloth, e.g. the Zorflex® range (from Chemviron Carbon).

An embodiment of the invention comprises a carbon coating comprising: a binder, activated carbon and carbon black, which can be coated directly onto the current collector with a method described in PCT patent application publication number WO/2009/062872, incorporated herein by reference in its entirety, to form an electrode.

The electrode may comprise a current collector. The current collector may be made from an electrically conducting material. Suitable metal free materials are e.g. carbon, such as graphite, graphene, graphite sheets or carbon mixtures with high graphite content. It is advantageous to use a metal free electrode and current collector, because metals are expensive and introduce a risk of corrosion. The current collector is generally in the form of a sheet. Such sheet is herein defined to be suitable to transport at least 33 Amps/$m^2$ and up to 2000 Amps/$m^2$. The thickness of a graphite current collector then typically becomes from 100 to 1000 micrometers, generally 200 to 500 micrometers.

Spacer

The spacer material may comprise an inert type material, such as an open space synthetic material and can be any material made from, e.g., a polymer, plastic or fiberglass. The spacer can be a porous or non porous, woven or non woven material. The spacer may be prepared from a material that is electrically insulating, but allows ion conductance. Suitable spacers are for example the Nitex® range or Petex® range (from Sefar), which are open mesh fabrics or filter fabrics, made from polyamide or polyethylene terephthalate.

Charge Barrier Layer

The flow through capacitor may comprise a charge barrier. The charge barrier comprises a membrane, selective for anions or cations, or certain specific anions or cations, which may be placed between the electrode and the spacer. The charge barrier may be applied to the high surface area electrode layer as a coating layer or as a laminate layer.

Suitable membrane materials may be homogeneous or heterogeneous. Suitable membrane materials comprise anion exchange and/or cation exchange membrane materials, desirably ion exchange materials comprising strongly dissociating anionic groups and/or strongly dissociating cationic groups. Examples of such membrane materials are Neosepta™ range materials (from Tokuyama), the range of PC-SA™ and PC-SK™ (from PCA GmbH), ion exchange membrane materials from Fumatec, Ralex™ ion exchange membrane materials (from Mega) or the Excellion™ range of heterogeneous membrane material (from Snowpure).

Stack

A FTC may comprise at least one repeating unit of:
anionic electrode comprising a current collector
optionally an anion exchange membrane as a charge barrier
a conventional FTC spacer
optionally a cation exchange membrane as a charge barrier
cathode electrode comprising a current collector Multiple repeating units may be used to build up a stack and in an embodiment of the current invention the stacks are provided with a tray to position the stack within the apparatus for removal of ions and to obtain equal distribution of pressure and water flow.

Typically the number of repeating units in a FTC stack, as found in practice, is limited by the number of electrode layers than can be practically bundled and connected to the connector. It is desirable that the number of repeating units in a FTC is at least 1, at least 5, at least 10, or at least 20. For practical reasons, the number of repeating units is generally not more than 200, not more than 150, not more than 100, or not more than 50.

The stack may be compressed at a pressure of less than 5 Bar, less than 2 Bar, less than 1 Bar or around 0.5 Bar. The stack may be provided with a so called floating electrode. A floating electrode is an electrode not directly being connected to a power source but receiving a polarized charge from one or more other electrodes in the stack which are connected to a power source or from one or more other floating electrodes. A floating electrode may be positioned parallel and in between master electrodes in the stack. An embodiment of the invention may be used to connect the master electrodes in the stack to the power source. An advantage of using a floating electrode is that the voltages on the connector may be higher while the currents through the connector may be lower. Electrical loss due to the resistivity in the connector may be lowered significantly by using a floating electrode.

Accordingly an embodiment of the invention comprises: providing a first electrode; providing a spacer against the first electrode; providing a second electrode against the spacer, the second electrode being a floating electrode; providing a spacer against the second electrode: providing a third electrode against the spacer; connecting the first electrode with a first connector to a first power terminal; connecting the third electrode with a second connector to a second power terminal; and exerting a force on the stack so as to compress the first, second and third electrodes to each other, the first and/or second connector allowing for movement of the first and/or third electrode with respect to the first and/or second power terminal. A plurality of floating electrodes may be positioned between the first and third electrodes.

Embodiments are also provided in the following numbered clauses;

1. A method of producing an apparatus for removal of ions from water, the method comprises:
   manufacturing a stack by;
      providing a first electrode,
      providing a spacer against the first electrode, and
      providing a second electrode against the spacer;
   connecting the first electrode with a first connector to a first power terminal;
   exerting a force on the stack so as to compress the first and second electrodes and the spacer, while allowing movement of the first electrode with respect to the first power terminal by the first connector.

2. The method according to clause 1, wherein during manufacturing of the stack the following steps are repeated multiple times:
providing a first electrode;
providing a spacer against the first electrode;
providing a second electrode against the spacer; and
providing a spacer against the second electrode.

3. The method according to clause 2, wherein each first electrode is connected with the first connector to the first power terminal; and the first connector allows movement of at least one of the first electrodes with respect to the first power terminal.

4. The method according to any of the clauses 1 to 3, comprising:
providing a plurality of stacks each comprising a plurality of first electrodes;
connecting the plurality of first electrodes with a first connector to the first power terminal; and
exerting a substantial equal force on the multiple stacks simultaneously, wherein the first connector allows for movement of at least one of the plurality of first electrodes with respect to the first power terminal.

5. The method according to any of the preceding clauses, further comprising connecting the second electrode to a second power terminal with a second connector and during exerting a force on the stack so as to compress the first and second electrodes to each other the second connector allows for movement of the second electrode with respect to the second power terminal.

6. The method according to any of clauses 1 to 4, wherein the second electrode is a floating electrode and the method further comprises providing a third electrode against the spacer provided against the second electrode and connecting the third electrode to a second power terminal with a second connector, wherein, during exerting a force on the stack so as to compress the first, second and third electrodes to each other, the second connector allows for movement of the third electrode with respect to the second power terminal.

7. The method according to any of the preceding clauses, further comprising providing a resin, glue, paste or any other water barrier along the first and/or second power terminal and/or through the first and/or second connector.

8. The method according to any of the preceding clauses, further comprising exerting a force on one or multiple stacks with a resulting pressure between the first and second electrodes of less than 5 Bar, less than 2 Bar, less than 1 Bar or around 0.5 Bar, 9. The method according to any of the preceding clauses, further comprising: connecting the electrode with a first connector while exerting a force between the first electrode and the first connector with a resulting pressure of less than 100 Bar, less than 50 Bar, less than 20 Bar or around 10 Bar between the first electrode and the first connector.

10. The method according to any of the preceding clauses, wherein during manufacturing of the stack a tray is provided to hold the stack.

11. The method according to clause 10, wherein during manufacturing the first electrode is clamped on the tray using the first connector.

12. The method according to clause 10 or clause 11, wherein the first electrode is clamped on the tray with a resulting pressure of less than 100 Bar, less than 50 Bar, less than 20 Bar or around 10 Bar.

13. The method according to clause 11, further comprising sliding the first connector over a first rail of the first power terminal.

14. The method according to clause 13, further comprising aligning the tray with the first rail, with a housing to hold the tray, or with a previously provided tray.

15. An apparatus to remove ions from water obtainable by a method according to any of the preceding clauses.

While specific embodiments of the invention have been described above, it may be appreciated that the invention may be practiced otherwise than as described. For example, an embodiment of the invention may take the form of a computer program containing one or more sequences of machine-readable instructions describing a method as disclosed above, or a data storage medium (e.g. semiconductor memory, magnetic or optical disk) having such a computer program stored therein.

The descriptions above are intended to be illustrative, not limiting. Thus, it may be apparent to one skilled in the art that modifications may be made to the invention as described without departing from the scope of the claims set out below.

The invention claimed is:

1. An apparatus to remove ions, the apparatus comprising:
multiple stacks, each stack comprising:
a first electrode,
a second electrode, and
a spacer, in between the first and second electrodes, allowing water to flow in between the first and second electrodes;
wherein at least one of the stacks comprises a tray configured to hold and position the at least one stack within a housing of the apparatus and the tray comprises:
a positioning alignment feature that is movable with the tray relative to the housing, the positioning alignment feature configured to position, on the tray, one or more selected from: the first electrode, the second electrode, the spacer or a charge barrier, by physical contact with the one or more selected from: the first electrode, the second electrode, the spacer or a charge barrier; and
a rim extending substantially perpendicularly to a surface of the tray, the surface facing a surface of the first electrode, the second electrode, or both the first electrode and the second electrode.

2. The apparatus according to claim 1, wherein the one or more selected from: the first electrode, the second electrode, the spacer, or the charge barrier, comprises an alignment feature for its respective physical positioning on the tray.

3. The apparatus according to claim 1, wherein the tray comprises an alignment feature to position the tray in the housing of the apparatus.

4. The apparatus according to claim 1, comprising the housing, wherein the housing comprises an alignment feature to position the tray in the apparatus.

5. The apparatus according to claim 1, wherein the tray comprises an apparatus alignment feature to position the tray in the apparatus, the apparatus alignment feature comprising a connector configured to electrically connect the first electrode, the second electrode, or both the first electrode and the second electrode, to a power terminal.

6. The apparatus according to claim 1, wherein the tray comprises an opening to allow water to flow through the tray.

7. The apparatus according to claim 1, wherein the tray comprises an opening constructed and arranged to allow electrical connection of the first electrode, the second electrode, or both the first electrode and the second electrode, to a power terminal.

8. A method of producing an apparatus to remove ions from water, the method comprising:
  manufacturing a plurality of stacks by, for each stack:
    providing a first electrode,
    providing a spacer against the first electrode, and
    providing a second electrode against the spacer,
    wherein the spacer allows water to flow in between the first and second electrodes, at least one of the stacks is made using a tray holding the at least one stack, and the tray comprises a surface facing a surface of the first electrode, the second electrode, or both the first electrode and the second electrode, and a rim extending substantially perpendicularly to the surface of the tray; and
  positioning the plurality of stacks including the tray having the at least one stack, within a housing of the apparatus.

9. An apparatus to remove ions, the apparatus comprising:
  multiple stacks, each stack comprising:
    a first electrode,
    a second electrode, and
    a spacer, in between the first and second electrodes, allowing water to flow in between the first and second electrodes;
  wherein at least one of the stacks comprises a tray configured to hold and position the at least one stack within a housing of the apparatus, and
  wherein the tray comprises a surface facing a surface of the first electrode, the second electrode, or both the first electrode and the second electrode, and a rim extending substantially perpendicularly to the surface of the tray.

10. The apparatus according to claim 9, wherein the tray comprises an alignment feature to align the tray with another tray.

11. The apparatus according to claim 9, wherein one or more selected from: the first electrode, the second electrode, the spacer or a charge barrier, of the at least one stack comprises an alignment feature constructed and arranged to align by physical contact with an alignment feature of the tray.

12. An apparatus to remove ions, the apparatus comprising:
  multiple stacks, each stack comprising:
    a first electrode,
    a second electrode, and
    a spacer, in between the first and second electrodes, allowing water to flow in between the first and second electrodes;
  wherein at least one of the stacks further comprises a tray configured to hold and position the at least one stack within a housing of the apparatus and the tray comprises:
    an alignment feature that is part of the tray, the alignment feature configured to position, on the tray, one or more selected from: the first electrode, the second electrode, the spacer or a charge barrier, by physical contact with the one or more selected from: the first electrode, the second electrode, the spacer or a charge barrier, the alignment feature comprising a protruding structure movable with the tray relative to the housing, the protruding structure protruding from a surface of the tray arranged to face a surface of the first electrode, the second electrode, or both the first electrode and the second electrode; and
    a rim extending substantially perpendicularly to the surface of the tray.

13. The apparatus of claim 12, wherein the one or more selected from: the first electrode, the second electrode, the spacer, or the charge barrier, comprises an alignment feature for its respective physical positioning on the tray.

14. The apparatus according to claim 11, wherein the tray comprises a housing alignment feature to position the tray in the housing of the apparatus.

15. The apparatus according to claim 11, comprising the housing, wherein the housing comprises an alignment feature to position the tray in the apparatus.

16. The apparatus according to claim 11, wherein the tray comprises an opening to allow water to flow through the tray.

17. The apparatus according to claim 11, wherein the tray comprises an opening constructed and arranged to allow electrical connection of the first electrode, the second electrode, or both the first electrode and the second electrode, to a power terminal.

18. The apparatus according to claim 12, wherein the protruding structure is a pin or a rod.

19. The apparatus according to claim 12, wherein the rim has a corner to contact physically the one or more selected from: the first electrode, the second electrode, the spacer or a charge barrier.

20. The method of claim 8, wherein the tray further comprises a positioning alignment feature that is part of the tray, the positioning alignment feature configured to position, on the tray, one or more selected from: the first electrode, the second electrode, the spacer or a charge barrier, by physical contact with the one or more selected from: the first electrode, the second electrode, the spacer or a charge barrier, the positioning alignment feature comprising a corner of the rim or a protruding structure movable with the tray relative to the housing.

21. The apparatus of claim 1, wherein the positioning alignment feature comprises a corner of the rim or a protruding structure movable with the tray relative to the housing.

22. The apparatus of claim 1, wherein the tray comprises a tray alignment feature, movable with the tray relative to the housing, to align the tray with another tray through direct physical contact of the tray alignment feature with a portion of the other tray.

* * * * *